(12) United States Patent
Kruse et al.

(10) Patent No.: US 8,966,884 B2
(45) Date of Patent: Mar. 3, 2015

(54) EXHAUST GAS TREATMENT DEVICE AND MOTOR VEHICLE HAVING THE DEVICE

(71) Applicants: EMITEC Gesellschaft fuer Emissionstechnologie mbH, Lohmar (DE); Volkswagen AG, Wolfsburg (DE)

(72) Inventors: Carsten Kruse, Troisdorf (DE); Thomas Nagel, Engelskirchen (DE); Joerg Sprute, Wahrenholz (DE)

(73) Assignees: EMITEC Gesellschaft fuer Emissionstechnologie mbH, Lohmar (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 13/732,553

(22) Filed: Jan. 2, 2013

(65) Prior Publication Data
US 2013/0118157 A1    May 16, 2013

Related U.S. Application Data

(63) Continuation of application No. PCT/EP2011/060809, filed on Jun. 28, 2011.

(30) Foreign Application Priority Data

Jul. 2, 2010    (DE) .......................... 10 2010 025 880

(51) Int. Cl.
*F01N 3/00* (2006.01)
*F01N 1/00* (2006.01)
(Continued)

(52) U.S. Cl.
CPC ............... *F01N 3/10* (2013.01); *F01N 3/2066* (2013.01); *F01N 2240/20* (2013.01);
(Continued)

(58) Field of Classification Search
USPC ............................. 60/286, 295, 299, 303, 324
See application file for complete search history.

(56) References Cited

U.S. PATENT DOCUMENTS 7,059,118 B2    6/2006    Ripper et al.
2007/0036694 A1*   2/2007    Nishioka et al. .............. 422/168
(Continued)

FOREIGN PATENT DOCUMENTS

DE    102006038904 A1    2/2008
DE    10 2006 051 788 A1    5/2008
(Continued)

OTHER PUBLICATIONS

International Search Report of PCT/EP2011/060809, (Sep. 2011).

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

An exhaust gas treatment device includes an exhaust gas treatment component for conducting a flow in a flow direction from an inflow side to an outflow side. A metering device for metering reducing agent into the exhaust gas treatment device is disposed downstream of the outflow side in the flow direction. The metering device has a metering direction which runs at least partially counter to the flow direction. The outflow side of the exhaust-gas treatment component is spanned at least partially by a porous layer and there is a spacing between the metering device and the exhaust-gas treatment component selected in such a way that injected reducing agent reaches the porous layer. A motor vehicle having the device is also provided.

9 Claims, 2 Drawing Sheets

(51) Int. Cl.
*F01N 3/10* (2006.01)
*F01N 3/20* (2006.01)

(52) U.S. Cl.
CPC ........ *F01N 2330/12* (2013.01); *F01N 2610/02* (2013.01); *F01N 2610/102* (2013.01); *F01N 2610/1453* (2013.01); *Y02T 10/24* (2013.01)
USPC .................. 60/286; 60/295; 60/303; 60/324

(56) References Cited

U.S. PATENT DOCUMENTS

2008/0041036 A1  2/2008  Witte-Merl
2011/0225952 A1  9/2011  Witte-Merl et al.
2012/0156105 A1  6/2012  Maus et al.

FOREIGN PATENT DOCUMENTS

| DE | 102008001212 | A1 | 10/2009 |
| DE | 10 2008 048 806 | A1 | 3/2010 |
| DE | 102009034072 | A1 | 1/2011 |
| EP | 1 748 162 | A1 | 1/2007 |
| WO | 03/004839 | A1 | 1/2003 |
| WO | 2009/127449 | A1 | 10/2009 |
| WO | 2009127449 | A1 | 10/2009 |

\* cited by examiner

EXHAUST GAS TREATMENT DEVICE AND MOTOR VEHICLE HAVING THE DEVICE

CROSS-REFERENCE TO RELATED APPLICATION

This is a continuation, under 35 U.S.C. §120, of copending International Application No. PCT/EP2011/060809, filed Jun. 28, 2011, which designated the United States; this application also claims the priority, under 35 U.S.C. §119, of German Patent Application DE 10 2010 025 880.6, filed Jul. 2, 2010; the prior applications are herewith incorporated by reference in their entirety.

BACKGROUND OF THE INVENTION

Field of the Invention

The invention relates to an exhaust gas treatment device including a metering device for a reducing agent. Such exhaust gas treatment devices with a metering device have been used increasingly in recent times for cleaning the exhaust gases from (mobile) internal combustion engines in motor vehicles. The invention also relates to a motor vehicle having the device.

Particularly thorough and effective cleaning of exhaust gases can frequently be achieved by metering a reducing agent into the exhaust gas of an internal combustion engine in an exhaust gas treatment device. One method in which such a metering of reducing agent is used is, for example, selective catalytic reduction (SCR), in which nitrous oxide compounds in the exhaust gas are reduced. The method of selective catalytic reduction is suitable, in particular, for lean-burn internal combustion engines in which an excess of air is present for combustion in relation to a stoichiometric fuel-air mixture. The exhaust gases from such internal combustion engines have a particularly high proportion of nitrous oxide compounds. In the process of selective catalytic reduction, nitrous oxide portions in the exhaust gas are reduced by using ammonia, for example, as a reducing agent. At sufficient temperatures, nitrous oxide compounds together with ammonia are reduced to harmless constituents such as water and nitrogen.

In order to provide ammonia to an exhaust gas system, the ammonia is normally not stored directly in the motor vehicle but instead is provided in the form of a precursor in a tank. Such a precursor is referred to as a reducing agent precursor or a reducing agent precursor solution. Such a reducing agent precursor solution from which ammonia can be obtained is, for example, a urea-water solution. For example, a 32.5% urea-water solution, which is available commercially under the trademark AdBlue, is used in the automotive sector. Such a reducing agent precursor can be converted into reducing agent, for example, thermally and/or by using a catalyst inside the exhaust gas flow in the exhaust system or in a reactor outside the exhaust gas.

In order for reducing agent to be metered into an exhaust gas system, it is also injected in liquid form into the exhaust gas treatment device. The exhaust gas heat vaporizes the reducing agent and converts it at the same time. In order to achieve this effectively and reliably, it is necessary for the reducing agent to be present in the exhaust gas flow in the form of ultra-fine droplets and distributed as finely possible. It is regularly a problem that large droplets of reducing agent do not evaporate sufficiently quickly.

In addition, it should be ensured that the injected reducing agent does not make contact with cold surfaces of the exhaust gas treatment device. Another common problem is that reducing agent condenses on such cold surfaces and under certain circumstances forms undesirable deposits.

The prior art, such as for example International Publication No. WO 2009/127449 A1, discloses a capture medium disposed in the exhaust gas pipe on which injected reducing agent rests and is fully evaporated. That capture medium is thermally isolated from the cold outer wall of an exhaust gas pipe. In that case the capture medium can only be mounted with substantial technical complexity and is exposed to vibrations to a not insignificant extent.

SUMMARY OF THE INVENTION

It is accordingly an object of the invention to provide an improved exhaust gas treatment device with a metering device for a reducing agent and a motor vehicle having the device, which overcome the hereinafore-mentioned disadvantages and at least partly alleviate the highlighted problems of the heretofore-known devices and vehicles of this general type.

With the foregoing and other objects in view there is provided, in accordance with the invention, an exhaust gas treatment device, comprising an exhaust gas treatment component having an inflow side and an outflow side, the exhaust gas treatment component configured to conduct exhaust gas from the inflow side to the outflow side in a flow direction, a porous layer at least partially spanning the outflow side, and a metering device disposed downstream of the outflow side in the flow direction, the metering device configured to inject reducing agent into the exhaust gas treatment device in a metering direction running at least partly counter to the flow direction. The metering device and the exhaust gas treatment component are disposed at a mutual spacing selected to cause injected reducing agent to reach the porous layer.

An exhaust gas treatment component can, for example, be an oxidation catalytic converter or a particle filter. It can be produced with a metal carrier structure which can be wrapped, wound or stacked with at least one at least partially structured layer, in particular of corrugated and smooth metal layers. The exhaust gas cleaning component can also be a ceramic, in particular an extruded carrier.

The exhaust gas cleaning component preferably has a plurality of channels extending from the inflow side to the outflow side which are separated from each other by channel walls. The channel walls can be interrupted in regions so that within the exhaust gas treatment component the exhaust gas flowing through different channels can be mixed. The exhaust gas cleaning component is preferably constructed as a monolith and/or as a honeycomb body.

The flow direction through the exhaust gas treatment device starts from an internal combustion engine and runs through a complete exhaust gas treatment system having the exhaust gas treatment device according to the invention, to an outlet from the exhaust gas system.

The metering device can, for example, be an injector for injecting the reducing agent. Such an injector sprays pressurized, preferably liquid reducing agent into the exhaust gas treatment device. The metering direction (in other words the direction of the jet in which the reducing agent is supplied) is configured so as to guarantee as fine a distribution as possible of the reducing agent in the exhaust gas treatment device. The individual reducing agent droplets generated by the metering device are as small as possible. Preferably, the reducing agent droplets generated by the metering device have an average diameter of less than 200 μm, preferably less than 100 μm. In order to guarantee a targeted supply of reducing agent droplets towards the porous layer even in strong exhaust gas flows, it is further preferred for the mean diameter to be no less than 50 μm.

The outflow side of the exhaust gas treatment component is spanned at least partially by a porous layer. This means, in particular, that the porous layer at least partly covers the outflow side. Exhaust gases emerging from the exhaust gas treatment component must consequently pass at least partly through the porous layer in order to flow further in the flow direction into the exhaust gas treatment device. In a preferred embodiment variant of the device according to the invention, the outflow side is completely spanned or covered by the porous layer. Then the exhaust gas which flows through the exhaust gas treatment component must also completely pass through the porous layer.

Where applicable, the porous layer can also be constructed as a layer composite, i.e. including several layers, in particular connected together. The layers can be constructed differently e.g. with regard to porosity and/or rigidity of form. Additionally, if it is preferred for all layers to cover each other (completely), the layer composite can also be formed in such a way that at least one partial segment of the layer composite includes more layers than another partial segment.

The spacing between the exhaust gas treatment component and the metering device is selected in such a way that the reducing agent supplied in operation of the exhaust gas treatment device reaches the porous layer. Preferably all the injected reducing agent reaches the porous layer. The spacing therefore depends on the exhaust gas flow speed and the speed of the injected reducing agent or the properties of the exhaust gas and the injected reducing agent. The spacing can therefore be increased for a low exhaust gas flow speed and vice versa, a structure which the skilled person can produce easily from simple experiments using conventional exhaust gas tests for motor vehicles. A property of the injected reducing agent which is important for the distance which can be bridged is the size of the reducing agent droplets being supplied. Small droplets are slowed rapidly by friction in the exhaust gas flow and can only travel over short sections or distances against the flow direction of the exhaust gases. Larger droplets, because of their mass inertia, decelerate more slowly and can therefore travel over longer sections or distances against the flow direction of the exhaust gases. The spacing is preferably less than 50 mm, in particular less than 30 mm and particularly preferably less than 20 mm. Thus it can be achieved, in particular, that the reducing agent is metered into a laminar flow profile of the exhaust gas after emergence from the exhaust gas cleaning component.

The device according to the invention allows the storage of reducing agent for contact with the exhaust gas in a zone of the exhaust gas treatment device suitable for oriented supply. Furthermore, a concrete application of the reducing agent into the exhaust gas flow is thus possible e.g. through the use of quantities of reducing agent adapted to the spatial distribution of the flowing exhaust gas (exhaust gas mass flow and/or exhaust gas temperature, etc.). Consequently, by concrete allocation of the (local) partial exhaust gas flows leaving the exhaust gas treatment component to the porous layer, the possibility is opened up of metering reducing agent more economically because it is used more effectively in a more targeted manner.

In accordance with another advantageous feature of the exhaust gas treatment device of the invention, the porous layer is disposed at least partly parallel to the outflow side. A parallel configuration (in particular completely) of the porous layer to the outflow side allows a particularly space-saving and simple positioning of the porous layer on the outflow side, in particular also in the laminar flow region downstream of the outflow side. At the same time such a configuration allows a rapid heat transfer from the exhaust gas treatment component to the porous layer. The (catalytically active) exhaust gas treatment component normally constitutes a temperature source which can heat the porous layer (directly and/or through the exhaust gas flow). As a result it is possible for reducing agent which has landed on the porous layer to be converted thermally with particular efficiency.

In accordance with a further advantageous feature of the exhaust gas treatment device of the invention, the porous layer includes a metal fabric or a metal fleece. Such a fleece can be constructed with precisely defined thermal properties and with a defined flow resistance. The flow resistance and thermal properties can be established by a choice of material of the individual metallic filaments of the fleece or fabric, by a choice of thickness of the filaments and/or by the density and thickness of the fleece or fabric. Where applicable, the fabric can fulfill (merely) a supporting function and the fleece can primarily store the reducing agent temporarily. The fabric (with a regular structure of wire filaments) and the fleece (with a random or chaotic or stochastic structure with wire filaments) can also be used together to create complex forms of the porous layer.

In accordance with an added preferred feature of the exhaust gas treatment device of the invention, the metal fleece can be electrically heated. The material for the fleece or the fabric is, in particular, electrically conductive so that through suitable contacting, the fleece or fabric can be heated with an electric current. The contacting can be provided separately or through the exhaust gas treatment component.

In accordance with an additional advantageous feature of the exhaust gas treatment device of the invention, the porous layer is made at least partly of titanium wire. In the presence of oxidizing media, a titanium oxide layer forms on the titanium wire. The exhaust gas from an internal combustion engine is such an oxidizing medium. A titanium oxide layer promotes the conversion of the reducing agent precursor solution into reducing agent or ammonia. A titanium oxide layer can be generated on the titanium wire even before processing into the porous layer.

In accordance with yet another advantageous feature of the exhaust gas treatment device of the invention, the porous layer is supported with a supporting structure on the exhaust gas treatment component. Quite particularly preferably in this case the porous layer is in contact only with the exhaust gas treatment component. With such a supporting structure, a defined distance can be set between the outflow side of the exhaust gas treatment component and the porous layer. The supporting structure can, for example, be constructed in the form of supporting pins which extend partly into channels of the exhaust gas treatment component. Furthermore, a supporting ring can be provided over the periphery of the exhaust gas treatment component and can form a clamping frame for the at least one porous layer. Such a supporting structure is preferably constructed with a defined thermal conductivity (e.g. because of a metallic material) which can transport thermal energy from the exhaust gas treatment component into the porous layer.

Thus, the porous layer can be placed particularly economically centrally in the exhaust gas treatment device and at the same time thermal bridges to an outer wall of an exhaust pipe can be avoided. Since the porous layer is attached to the exhaust gas treatment component, a heat flow from the porous layer to a (colder) outer wall or to an outer pipe of the exhaust gas treatment device is not possible or is at least substantially hindered. Preferably the porous layer is not in direct contact with an outer wall of an exhaust gas treatment device. The porous layer is also preferably attached only to an outflow side of an exhaust gas treatment component.

In accordance with yet a further advantageous feature of the exhaust gas treatment device of the invention, the porous metallic layer has a form deviating from a plane or is non-planar and is adapted to a spray pattern of the metering device for reducing agent.

The spray pattern of a metering device is determined, in particular, by the droplet distribution, the metering direction, the flow speed and/or the flow direction of the reducing agent emerging from the metering device. The form of the porous layer means above all the shape of the area formed by the porous layer. This can consequently, in particular, also be curved (partly, e.g. convex and/or concave). In order to adapt the form to the spray pattern, the form can, for example, be curved so that reducing agent emerging from the metering device covers substantially the same distance to the porous layer irrespective of the outlet direction from the metering device.

For example, the form can be selected in such a way that for any arbitrary metering direction, the distance from the metering device to the porous layer in the region of the spray cone of the metering device differs by maximally 40%, preferably maximally 20% and particularly preferably maximally 10%.

In the adaptation of the form to the spray pattern, the deflection of the supplied reducing agent by the exhaust gas flow can also be taken into account. For example, the form can be selected in such a way that on a variation of exhaust gas speed between 5 m/s and 20 m/s, in each case at least 60%, preferably at least 80% and particularly preferably at least 90% of the reducing agent reaches the porous layer. Preferably, for this purpose, the form of the porous layer is constructed to be curved in the direction towards the metering device.

In accordance with yet an added preferred feature of the exhaust gas treatment device of the invention, the form of the porous layer forms at least one depression towards the exhaust gas treatment component. In other words this means, in particular, that the form creates at least one depression so that a part of the porous layer forms a type of collar segment or protrusion around the contact region of the reducing agent. The collar segment or protrusion can form a curve on the porous layer, to put it simply e.g. in the manner of a horseshoe, a droplet, a circle or similar. Usually, it is suitable to adapt the number of depressions to the number of metering devices so that upon the provision of one metering device, precisely one depression is provided.

Furthermore, it is advantageous if the metering device is disposed in such a way that it lies outside a theoretical cylinder extending in the flow direction starting from the outflow side. The metering device is thus offset laterally from the main flow direction of the exhaust gas through the exhaust gas treatment device and does not therefore impede the exhaust gas flow through the exhaust gas treatment device. The porous layer on the outflow side, however can create a suitable target area for the reducing agent when it is supplied to the exhaust gas treatment device, in particular if the form of the porous layer, as stated above, is adapted to the spray pattern of the metering device.

It is also self-evident that it is possible for the porous layer to have a coating for conversion of the reducing agent, e.g. a hydrolysis coating, in the case that urea is used as a reducing agent.

With the objects of the invention in view, there is concomitantly provided a motor vehicle, comprising an internal combustion engine and an exhaust gas treatment device according to the invention configured to clean exhaust gases from the internal combustion engine.

The invention also concerns an exhaust gas treatment component which is constructed with at least one porous layer on the outflow side. In particular, this means an exhaust gas treatment component through which an exhaust gas can flow in a flow direction from an inflow side to an outflow side, wherein the outflow side of the exhaust gas treatment component is at least partly spanned by a porous layer. With regard to the structure of the porous layer and/or its fixing on the exhaust gas treatment component, reference is made in full to the explanations and preferred embodiments described above. This concerns, in particular, the features relating to the form of the porous layer which is adapted to a spray pattern of a metering device for reducing agent, and/or the structure of the porous layer. In addition, in particular a use of such an exhaust gas treatment component is proposed as a capture element for liquid reducing agent, in particular urea, in an exhaust gas treatment device, in particular of a motor vehicle.

Other features which are considered as characteristic for the invention are set forth in the appended claims, noting that the features listed individually in the claims can be combined in any arbitrary, technically sensible manner and may be supplemented by explanatory facts from the description, wherein further embodiment variants of the invention are indicated.

Although the invention is illustrated and described herein as embodied in an exhaust gas treatment device and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
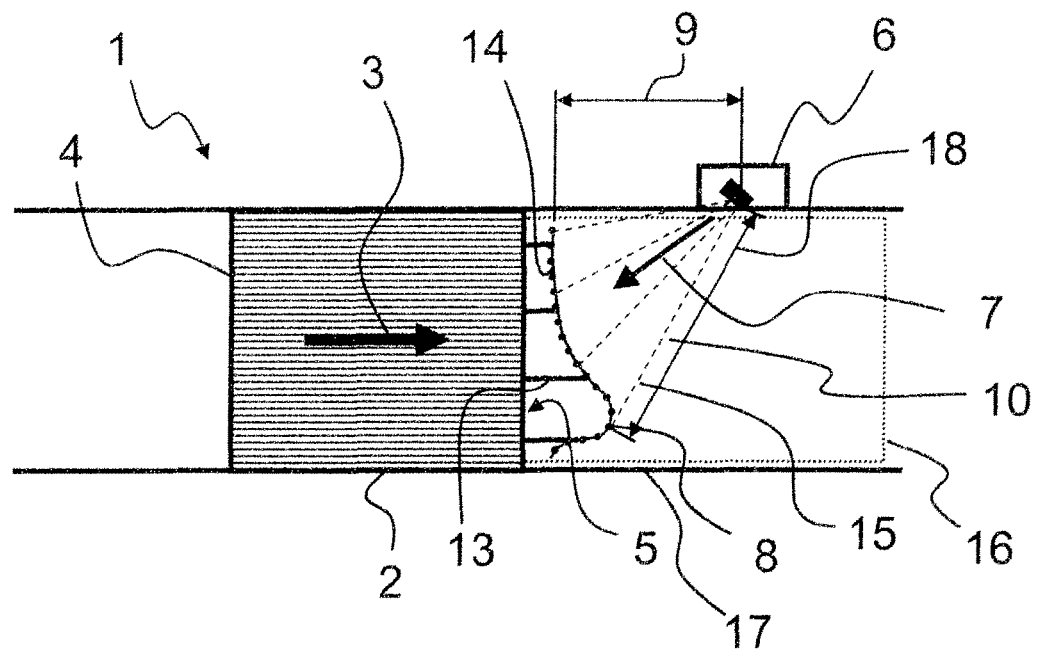
FIG. 1 is a diagrammatic, longitudinal-sectional view of an exhaust gas treatment device according to the invention.

Referring now in detail to the figures of the drawing for explaining the invention and the technical field in more detail by showing particularly preferred structural variants to which the invention is not restricted and in which, in particular, size ratios are merely depicted diagrammatically, and first, particularly, to FIG. 1 thereof, there is seen an exhaust gas treatment device 1 according to the invention. The exhaust gas treatment device 1 according to the invention includes an exhaust gas treatment component 2 through which an exhaust gas can flow in a flow direction 3 from an inflow side 4 to an outflow side 5. A metering device 6 is provided downstream of the outflow side 5 in the flow direction 3, at a spacing 9 from the outflow side 5. A porous layer 8 is provided on the outflow side 5. The metering device 6 supplies reducing agent 10 to the exhaust gas treatment device 1 in a metering direction 7 which runs at least partly counter to the flow direction 3. The metering device 6 itself can be disposed at an angle relative to the flow direction 3. It is however e.g. also possible for the metering device 6 to be disposed perpendicular to a line carrying the exhaust gas and have an integrated flow deflection device which achieves an oblique metering direction 7 (e.g. at an angle of at least 10° or even at least 15° to the extension axis of the metering device).

The porous layer 8 is supported by a supporting structure 13 on the outflow side 5 of the exhaust gas treatment component 2. The porous layer 8 has a form or shape 14 which is adapted to a spray pattern 15 of the metering device 6. The metering device 6 is formed in such a way as to partly protrude from the region of the exhaust gas treatment device 1 in which the exhaust gas mainly flows. In particular, the metering device 6 is disposed outside a theoretical cylinder 16 which extends in the flow direction 3 starting from the outflow side 5 of the exhaust gas treatment component 2. As a result, an additional flow resistance from the metering device 6 can be avoided. The form or shape 14 is adapted to the spray pattern 15 of the metering device 6 in such a way that a distance 18 from the metering device 6 to any arbitrary point on the porous layer 8 is substantially constant. The porous layer 8 intersects a cone extending from the metering device 6, preferably at a substantially constant distance from the metering device 6.

The reducing agent 10 supplied by the metering device 6 preferably does not reach an outer pipe 17 (or the outer wall) of the exhaust gas treatment device 1 (or exhaust pipe) so that no condensation of the reducing agent 10 occurs on the outer pipe 17. The outer pipe 17 is relatively cool because of the exterior temperature during operation.

Figure 2:
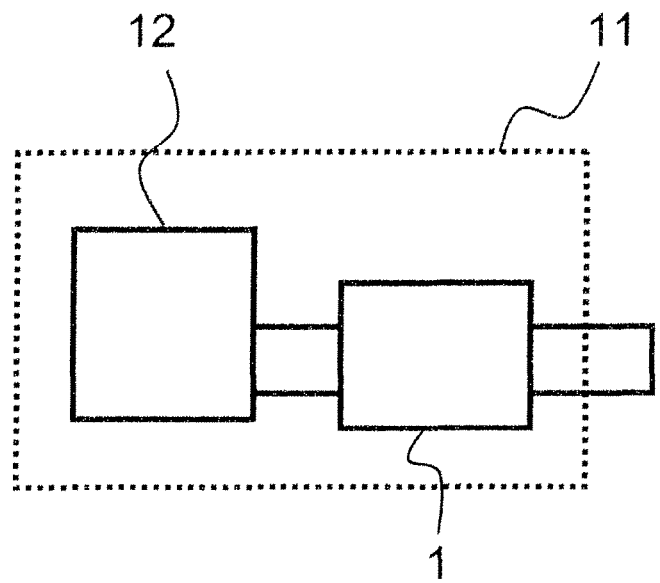
FIG. 2 is a sectional view of a motor vehicle including an exhaust gas treatment device according to the invention.

FIG. 2 shows a motor vehicle 11 including an internal combustion engine 12 and an exhaust gas treatment device 1 according to the invention, which is provided to clean or purify the exhaust gases from the internal combustion engine 12.

Figure 3:
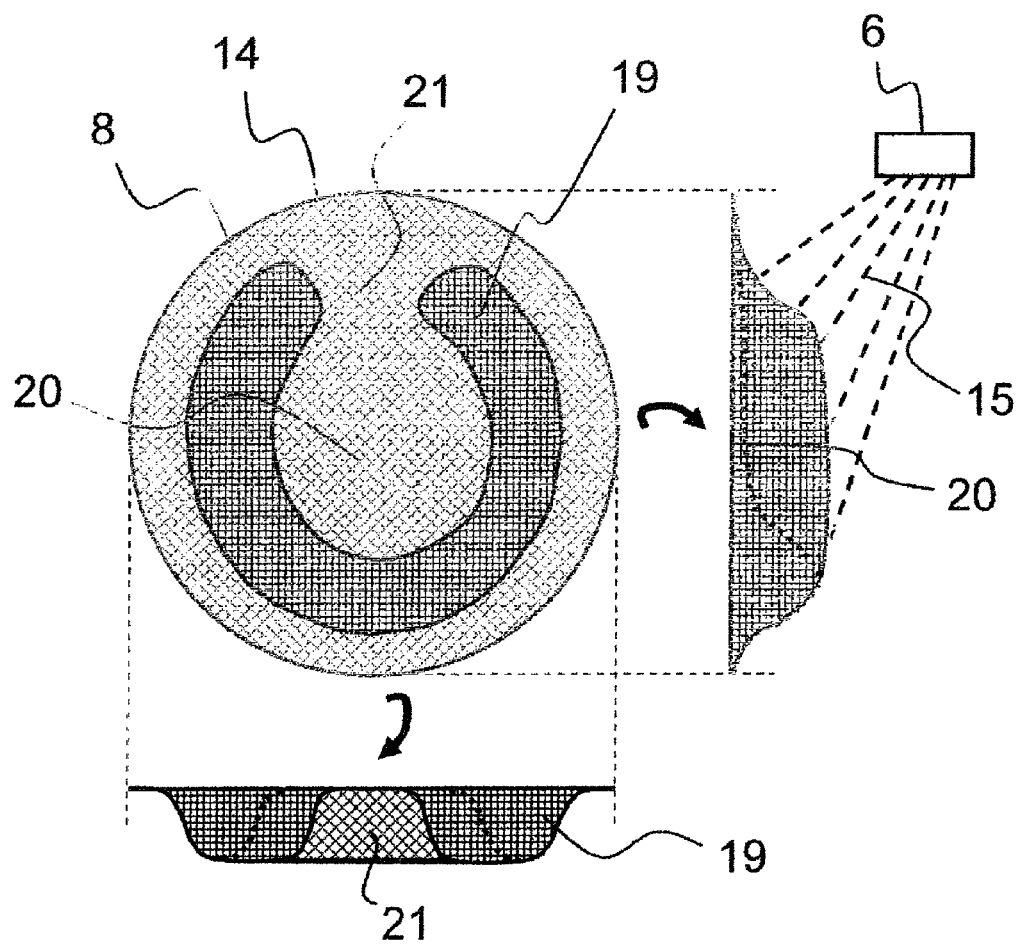
FIG. 3 is a group of three elevational views of a particular embodiment of a porous layer for an exhaust gas treatment component according to the invention.

FIG. 3 shows a particular embodiment of a porous layer 8 for an exhaust gas treatment component 2 according to the invention. The porous layer 8 is shown therein in three different views which are each folded according to the arrows shown between the views. The porous layer 8 has a peripheral protrusion 19 which surrounds a depression 20 and has an opening 21 at one point. The opening 21 is preferably disposed in such a way that it is disposed closest to a metering device 6 for reducing agent 10. The form or shape 14 of the porous layer 8 is thus adapted to a spray pattern 15 of the metering device 6. The protrusion 19 substantially surrounds the spray pattern 15 of the metering device 6 or a contact region of the reducing agent 10 on the porous layer 8.

The invention claimed is:

1. An exhaust gas treatment device, comprising:
   an exhaust gas treatment component having an inflow side and an outflow side, the exhaust gas treatment component configured to conduct exhaust gas from the inflow side to the outflow side in a flow direction;
   a porous layer completely spanning the outflow side such that the exhaust gas which flows through the exhaust gas treatment component must also completely pass through the porous layer, said porous layer including a metal fabric or a metal fleece; and
   a metering device disposed downstream of the outflow side in the flow direction, the metering device configured to inject reducing agent into the exhaust gas treatment device in a metering direction running at least partly counter to the flow direction;
   the metering device and the exhaust gas treatment component disposed at a mutual spacing selected to cause injected reducing agent to reach the porous layer.

2. The exhaust gas treatment device according to claim 1, wherein the porous layer is disposed at least partly parallel to the outflow side.

3. The exhaust gas treatment device according to claim 1, which further comprises a supporting structure supporting the porous layer on the exhaust gas treatment component.

4. The exhaust gas treatment device according to claim 1, wherein the metering device produces a reducing agent spray pattern, and the porous layer has a form deviating from a plane and adapted to the spray pattern.

5. The exhaust gas treatment device according to claim 1, wherein the porous layer is made at least partly of titanium wire.

6. A motor vehicle, comprising:
   an internal combustion engine; and
   an exhaust gas treatment device according to claim 1 configured to clean exhaust gases from the internal combustion engine.

7. The exhaust gas treatment device as claimed in claim 1, wherein the porous layer is placed in a laminar flow profile of the exhaust gas after emergence from the exhaust gas cleaning component.

8. The exhaust gas treatment device as claimed in claim 7, wherein the spacing is less than 50 mm so that the reducing agent is metered into the laminar flow profile of the exhaust gas after emergence from the exhaust gas cleaning component.

9. An exhaust gas treatment device, comprising:
   an exhaust gas treatment component having an inflow side and an outflow side, the exhaust gas treatment component configured to conduct exhaust gas from the inflow side to the outflow side in a flow direction;
   a porous layer at least partially spanning the outflow side; and
   a metering device disposed downstream of the outflow side in the flow direction, the metering device configured to inject reducing agent into the exhaust gas treatment device in a metering direction running at least partly counter to the flow direction;
   the metering device and the exhaust gas treatment component disposed at a mutual spacing selected to cause injected reducing agent to reach the porous layer;
   the metering device producing a reducing agent spray pattern, and the porous layer having a form deviating from a plane and adapted to the spray pattern, the form of the porous layer forming at least one depression towards the exhaust gas treatment component.

* * * * *